United States Patent
Bae et al.

(10) Patent No.: US 9,232,444 B2
(45) Date of Patent: Jan. 5, 2016

(54) METHOD AND APPARATUS FOR PERFORMING HANDOVER BETWEEN CORE NETWORK ENTITIES IN A PACKET-SWITCHED NETWORK

(75) Inventors: Eun-Hui Bae, Seoul (KR); Sung-Ho Choi, Suwon-si (KR); O-Sok Song, Seoul (KR); Han-Na Lim, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1087 days.

(21) Appl. No.: 11/490,530

(22) Filed: Jul. 21, 2006

(65) Prior Publication Data
US 2007/0064686 A1   Mar. 22, 2007

(30) Foreign Application Priority Data
Jul. 22, 2005   (KR) .................. 10-2005-0066664

(51) Int. Cl.
*H04W 36/18* (2009.01)
*H04W 36/00* (2009.01)
*H04W 36/14* (2009.01)

(52) U.S. Cl.
CPC .......... *H04W 36/0011* (2013.01); *H04W 36/14* (2013.01)

(58) Field of Classification Search
CPC .................................................... H04W 36/18
USPC .................................. 370/331, 436, 442, 443
See application file for complete search history.

(56) References Cited

U.S. PATENT DOCUMENTS

| | | | | |
|---|---|---|---|---|
| 6,301,479 | B1 * | 10/2001 | Roobol et al. ................. | 455/436 |
| 6,799,039 | B2 * | 9/2004 | Wu et al. ....................... | 455/436 |
| 6,904,025 | B1 | 6/2005 | Madour et al. ................ | 370/328 |
| 6,961,774 | B1 * | 11/2005 | Shannon et al. .............. | 709/227 |
| 7,369,522 | B1 * | 5/2008 | Soininen et al. .............. | 370/328 |
| 2002/0141361 | A1 * | 10/2002 | Madour et al. ................ | 370/331 |
| 2004/0085931 | A1 * | 5/2004 | Rezaiifar ..................... | 370/331 |

FOREIGN PATENT DOCUMENTS

| | | |
|---|---|---|
| CN | 1359581 A | 7/2002 |
| WO | WO 02/17670 A1 | 2/2002 |
| WO | WO 2004/077747 A1 | 9/2004 |

OTHER PUBLICATIONS

Nicolas Montavont et al.; "Handover Management for Mobile Nodes in IPv6 Networks" IEEE Communication Magazine, Aug. 2002, vol. 40, Issue 8; pp. 38-43.

(Continued)

*Primary Examiner* — Christopher M Brandt
(74) *Attorney, Agent, or Firm* — Jefferson IP Law, LLP

(57) ABSTRACT

A method and apparatus for performing a L3 handover between CNs in a packet-switched network are provided. When a UE moves from an old RAN to a new RAN, the UE sends a measurement report message including cell information to the old RAN. The old or new RAN determines whether to perform a L3 handover. If the L3 handover is required, a tunnel is established between the new RAN and a new CN. The UE performs a handover from the old RAN to the new RAN, without establishing a tunnel between the new RAN and an old CN. Upon detection of the movement of the UE, the new RAN sends a L2 handover complete message to the old RAN. After moving to the new RAN, the UE acquires a new IP address, performs the L3 handover, and communicates with the new CN through the new RAN.

18 Claims, 12 Drawing Sheets

(56) References Cited

OTHER PUBLICATIONS

Abdul Mukti Bin Ahmad and Mohd Dani Bin Bada; "Handover Strategy for Mobile Wireless LAN" 4th National Conference on Telecommunication Technology Proceedings, Shah Alam, Malaysia, Jan. 14, 2003, pp. 141-143.

Technical Specification Group GERAN; Packet Switched Handover for GERAN A/Gb mode; Stage 2 (Release 6); 3GPP TS 43.129 V2.0.0 (Nov. 2004).

* cited by examiner

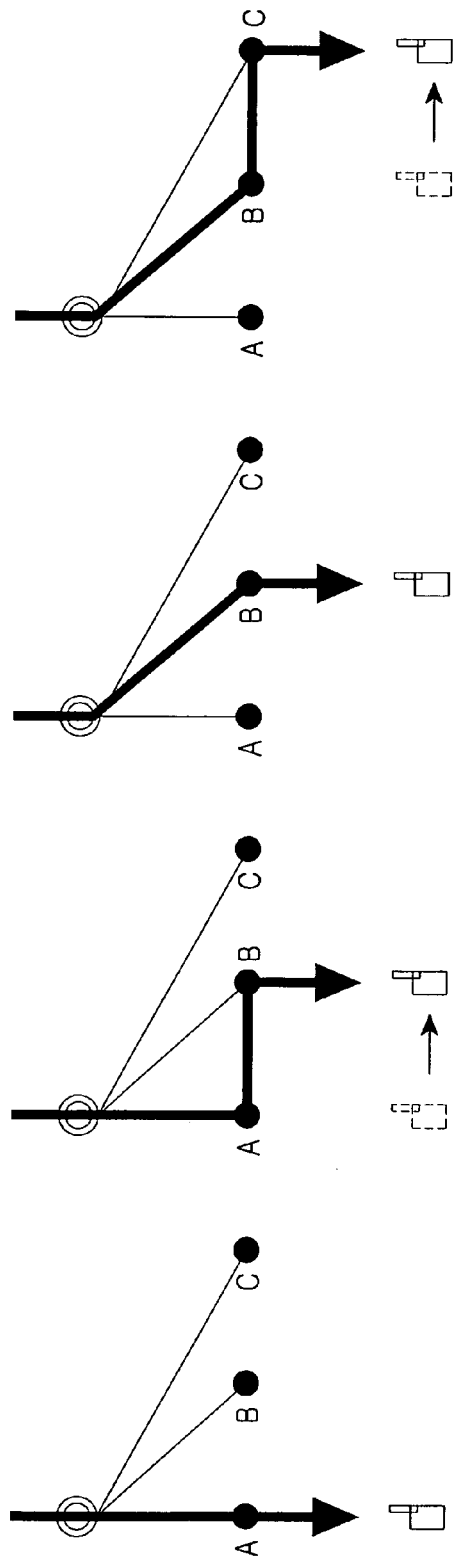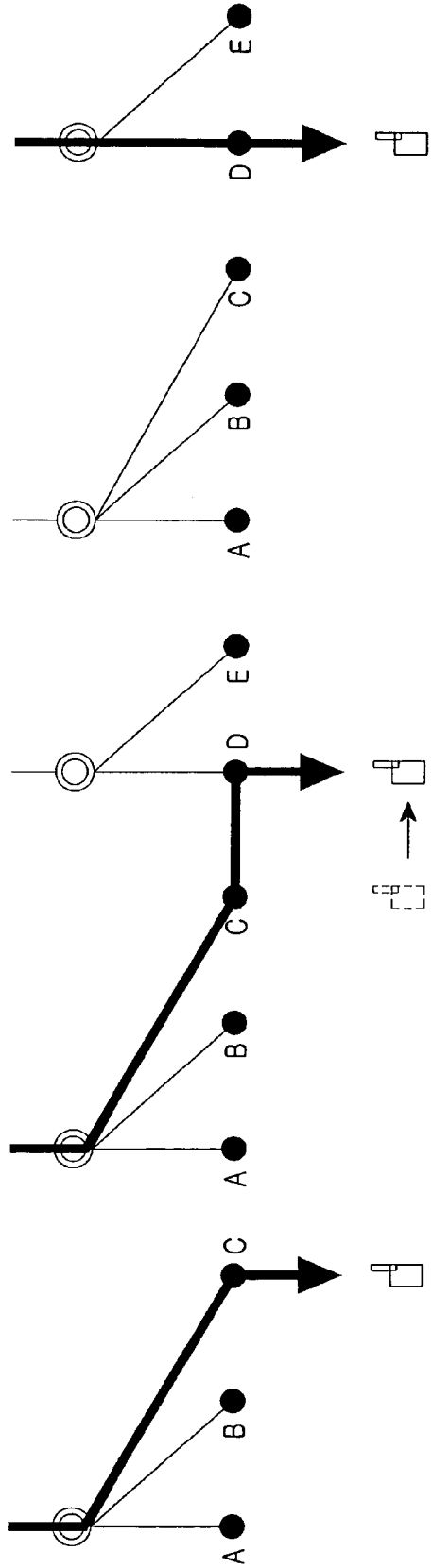
FIG. 2

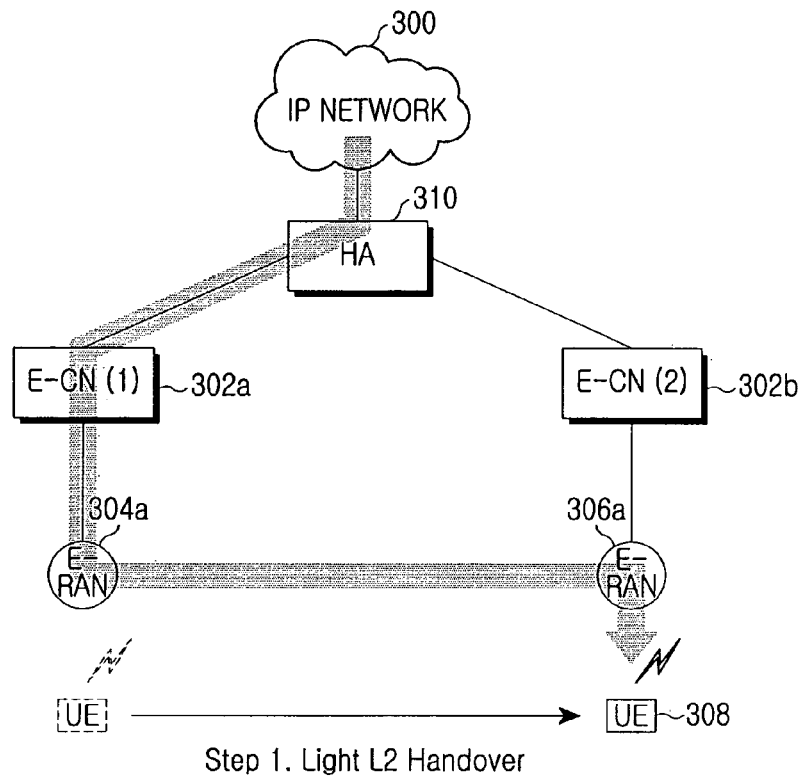
Step 1. Light L2 Handover
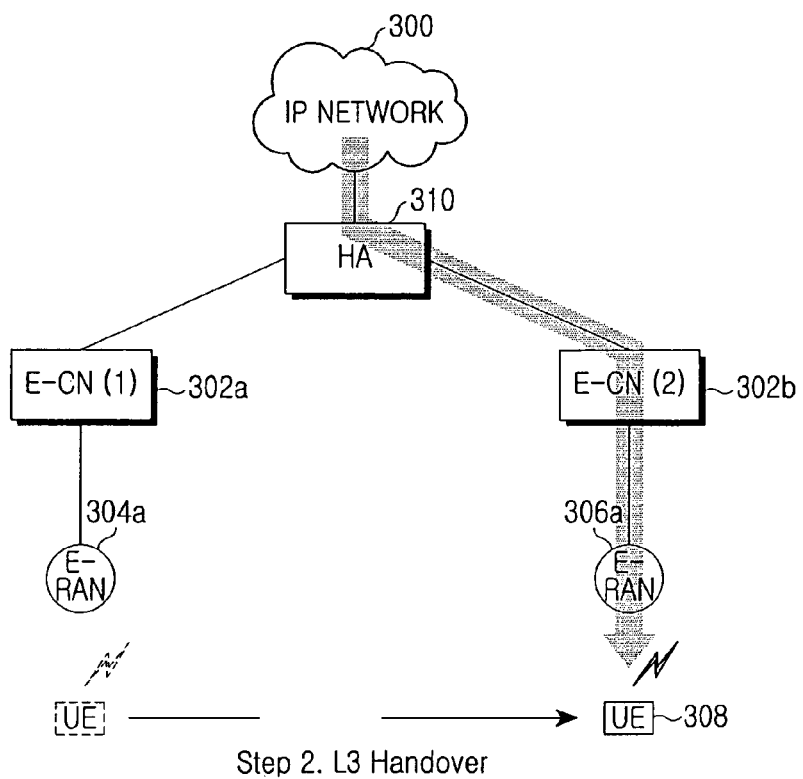
Step 2. L3 Handover
FIG.3

METHOD AND APPARATUS FOR PERFORMING HANDOVER BETWEEN CORE NETWORK ENTITIES IN A PACKET-SWITCHED NETWORK

CROSS-REFERENCE TO RELATED PATENT APPLICATION

This application claims the benefit under 35 U.S.C. §119 (a) to a Korean Patent Application filed in the Korean Intellectual Property Office on Jul. 22, 2005 and assigned Ser. No. 2005-66664, the entire disclosure of which is hereby incorporated by reference.

BACKGROUND OF THE INVENTION

1. Field of the Invention

The present invention relates generally to a packet-switched network. More particularly, the present invention relates to a method and apparatus for performing Layer 3 (L3) handover between Core Network (CN) entities in a packet-switched network.

2. Description of the Related Art

The Universal Mobile Telecommunication System (UMTS), an asynchronous 3rd Generation (3G) mobile communication system based on European Global System for Mobile communications (GSM) and General Packet Radio Services (GPRS) and operating in Wideband Code Division Multiple Access (WCDMA), provides a uniform service of sending packet text, digital voice or video, and multimedia data at or above 2 Mbps to mobile users or computer users irrespective of their locations. With an introduction of a concept of virtual access, UMTS enables access to any end point within a network. The virtual access refers to packet-switched connection using a packet protocol like Internet Protocol (IP).

Compared to the UMTS system where network entities are connected in Asynchronous Transfer Mode (ATM) and connected to an external packet data network via a gateway node (that is, Gateway GPRS Support Node (GGSN)), Enhanced-UMTS (E-UMTS) offers IP-based connectivity between network entities, thereby reducing the number of intermediate nodes via which a User Equipment (UE) is connected to the packet data network and thus enables fast data transmission.

A typical UMTS system is comprised of radio access networks (RANs) and a CN. A radio access network (RAN) takes charge of Layer 1 (L1) and Layer 2 (L2) protocols and is wirelessly connected to UEs. The CN takes charge of a L3 protocol and connects the RAN to an external network. The UMTS system provides L2 handover through Serving Radio Network System (SRNS) re-allocation and L3 handover through inter-Serving GPRS Support Node (inter-SGSN) handover.

As the typical UMTS system has evolved toward the packet switching-based 3G mobile communication network, there is a need for supporting fast and seamless handover between RANs belonging to different CN entities.

SUMMARY OF THE INVENTION

An aspect of exemplary embodiments of the present invention is to address the above problems and/or disadvantages and to provide at least the advantages described below. Accordingly, an aspect of exemplary embodiments of the present invention is to provide a method and apparatus for performing fast and seamless handover between CN entities in a packet-switched network developed from a 3G mobile communication system.

According to one aspect of exemplary embodiments of the present invention, in a method of performing a handover between CNs in a packet-switched network having a plurality of RANs accessible to a UE and the CNs for connecting the RANs to an external network over IP, when the UE connected to an old CN through the old RAN moves from the old RAN to a new RAN belonging to a new CN, the UE sends a measurement report message including cell information to the old RAN. The old or new RAN determines whether a L3 handover is to be performed between the CNs. If the L3 handover is to be performed between the CNs, a tunnel is established between the new RAN and the new CN. The UE performs a handover from the old RAN to the new RAN by the UE, without establishing a tunnel between the new RAN and the old CN, and upon detection of the movement of the UE, the new RAN sends a L2 handover complete message to the old RAN. After moving to the new RAN, the UE acquires a new IP address for use in the new CN, performs the L3 handover, and communicates with the new CN through the new RAN.

According to another aspect of exemplary embodiments of the present invention, in an apparatus for performing a handover between CNs in a packet-switched network, an old RAN belonging to an old CN receives a measurement report message requesting a handover from a UE, generates a handover required message in response to the measurement report message, receives a handover command message for the UE, and forwards the handover command message to the UE. A new RAN belonging to a new CN sends the handover command message to the old RAN in response to the handover required message, determines whether a L3 handover is to be performed between the old CN and the new CN by comparing an IP address of the UE with an IP address of the new CN, and establishes a tunnel with the new CN without establishing a tunnel with the old CN. The UE acquires a new IP address for use in the new CN after performing an inter-RAN handover in response to the handover command message, performs the L3 handover using the new IP address, and communicates with the new CN through the new RAN.

According to a further aspect of exemplary embodiments of the present invention, in an apparatus for performing a handover between CNs in a packet-switched network, an old RAN belonging to an old CN receives a measurement report message requesting a handover from a UE, generates a handover-required message in response to the measurement report message, receives a handover command message for the UE, forwards the handover command message to the UE, and determines whether a L3 handover is to be performed between the old CN and a new CN by comparing an IP address of the UE with an IP address of the new CN. A new RAN belonging to the new CN sends the handover command message to the old RAN in response to the handover required message, and establishes a tunnel with the new CN without establishing a tunnel with the old CN, according to whether the L3 handover is to be performed. The UE acquires a new IP address for use in the new CN after performing an inter-RAN handover in response to the handover command message, performs the L3 handover using the new IP address, and communicates with the new CN through the new RAN.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following detailed description taken in conjunction with the accompanying drawings, in which:

FIG. 2 conceptually illustrates a handover procedure according to an exemplary embodiment of the present invention;

FIG. 3 illustrates a L2 and L3 handover procedure in detail according to an exemplary embodiment of the present invention;

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In accordance with exemplary embodiments of the present invention as described below, when a UE moves between RANs belonging to different CNs, an inter-domain handover is performed. The inter-domain handover is triggered in cases where the UE changes its L3 attachment point, that is, when the L3 attachment point is changed through inter-CN handover or through handover between an enhanced 3G mobile communication network and a Wireless Local Area Network (WLAN).

Figure 1:
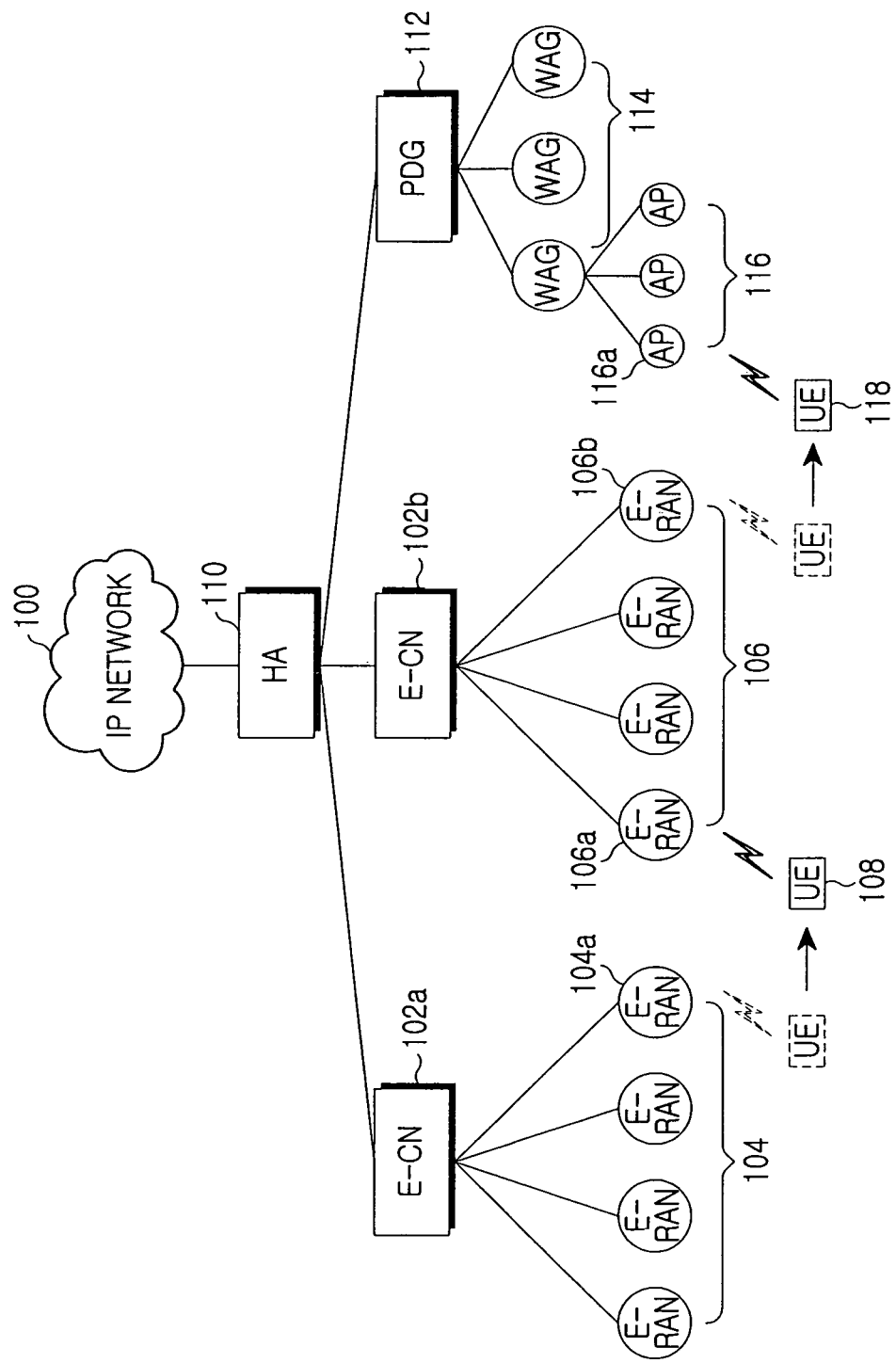
FIG. 1 illustrates a network configuration according to an exemplary embodiment of the present invention.

FIG. 1 illustrates a network configuration according to an exemplary embodiment of the present invention. The network configuration comprises a packet-switched network developed from a 3G mobile communication system and is applicable to a 3G Long Term Evolution (LTE) network, that is, an Evolution/Enhanced network.

Referring to FIG. 1, the network includes a plurality of Enhanced-Core Networks (E-CNs) 102a and 102b connected to an IP network 100 under the control of a Home Agent (HA) 110, and a plurality of E-RANs 104 and 106 connected to the E-CNs 102a and 102b. The term "E(Enhanced)" means that the entities communicate with each other over a packet switching protocol such as IP. A Packet Data Gateway (PDG) 112 is connected to the HA 110. A plurality of WLAN Access Gateways (WAGs) 114 is connected to the PDG 112, and a plurality of Access Points (APs) 116 is connected to each of the WAGs 114. While the HA 110 is shown as a physically independent entity, the HA 110 may be configured to be a logical entity included in the E-CNs 102a and 102b.

During moving from the E-RAN 104a belonging to the E-CN 102a to the E-RAN 106a belonging to the E-CN 102b, a UE 108 performs L2 handover and L3 handover simultaneously. When the UE 118 moves from the E-RAN 106b to the AP 116a belonging to the PDG 112, the UE 118 also performs L2 handover and L3 handover simultaneously. The L2 handover is carried out by a known WLAN L2 protocol. The following description is made of an operation of the UE 108 for handover between the E-CNs 102a and 102b, by way of example.

FIG. 2 conceptually illustrates a handover procedure according to an exemplary embodiment of the present invention. In FIG. 2, three E-RANs A, B and C belong to a first E-CN and two E-RANs D and E belong to a second E-CN.

Referring to FIG. 2, a UE is connected to the first E-CN via E-RAN A in step 1 before L2 handover. In step 2, the UE moves to E-RAN B through phase 1 of the L2 handover and is connected to the first E-CN via E-RAN B and E-RAN A. After completing phase 1 of the L2 handover, the UE is connected to the first E-CN via E-RAN B, that is, the UE performs phase 2 of the L2 handover in step 3. As the UE moves to E-RAN C through the L2 handover, the UE is connected to the first E-CN via E-RAN C and E-RAN B, that is, the UE performs phase 1 of the L2 handover in step 4. The UE completes phase 2 of the L2 handover and is connected to the first E-CN via E-RAN C in step 5.

In step 6, as the UE moves from E-RAN C belonging to the first E-CN to E-RAN D belonging to the second E-CN, the UE performs phase 1 of the L2 handover to the first E-CN via E-RAN D and E-RAN C. Before, after or during the L2 handover to E-RAN D, a new data path is set up between the second E-CN and E-RAN D, and data buffered in E-RAN C is forwarded to the UE via E-RAN D. The UE is then able to directly access the second E-CN via E-RAN D by L3 handover in step 7. Accordingly, the UE proceeds from step 6 directly to step 7, thereby simplifying the handover procedure.

As described above, the L2 handover procedure is divided into two phases. In phase 1, the UE moves from the old E-RAN to the new E-RAN, while a connection is kept between the E-CN and the old E-RAN. Phase 1 takes place from step 1 to step 2, from step 3 to step 4, and from step 5 to step 6 in FIG. 2. In phase 2, a new data path is established between the E-CN and the new E-RAN and the old E-RAN forwards buffered data to the UE via the new E-RAN. Phase 2 occurs from step 2 to step 3 and from step 4 to step 5 in FIG. 2.

When the UE moves between RANs belonging to different CNs, L2 and L3 handovers are performed. In accordance with an exemplary embodiment of the present invention, phase 1 is performed during the L2 handover as being a preliminary operation for the L3 handover, to thereby simplify the L3 handover procedure. The L2 handover without phase 2 is called a light L2 handover herein.

FIG. 3 illustrates a L2 and L3 handover procedure in detail according to an exemplary embodiment of the present invention. In FIG. 3, old and new E-CNs 302a and 302b are connected to an IP network 300 via a HA 310. Old and new E-RANs 304a and 306a are connected to the old and new E-CNs 302a and 302b, respectively. When a UE 308 moves from the old E-RAN 304a to the new E-RAN 306a, the UE 308 performs a L3 handover alongside a light L2 handover.

Referring to FIG. 3, the UE 308 moves from the old E-RAN 304a to the new E-RAN 306a by the light L2 handover, while being connected to the old E-CN 302a via the new E-RAN 304a and the old E-RAN 304a in step 1. After a tunnel is established between the new E-RAN 306a and the new E-CN 302b, the L3 handover is completed and the UE 308 is connected to the new E-CN 302b via the new E-RAN 306a in step 2.

Certain exemplary embodiments of the present invention for providing handover between E-CNs in an enhanced 3G mobile communication network will be described below. An exemplary embodiment of the present invention is characterized in that the new E-RAN triggers the L3 handover in the light L2 handover and L3 handover procedure. An exemplary embodiment of the present invention is also characterized in that the old E-RAN triggers the L3 handover in the light L2 handover and L3 handover procedure.

Figure 4:
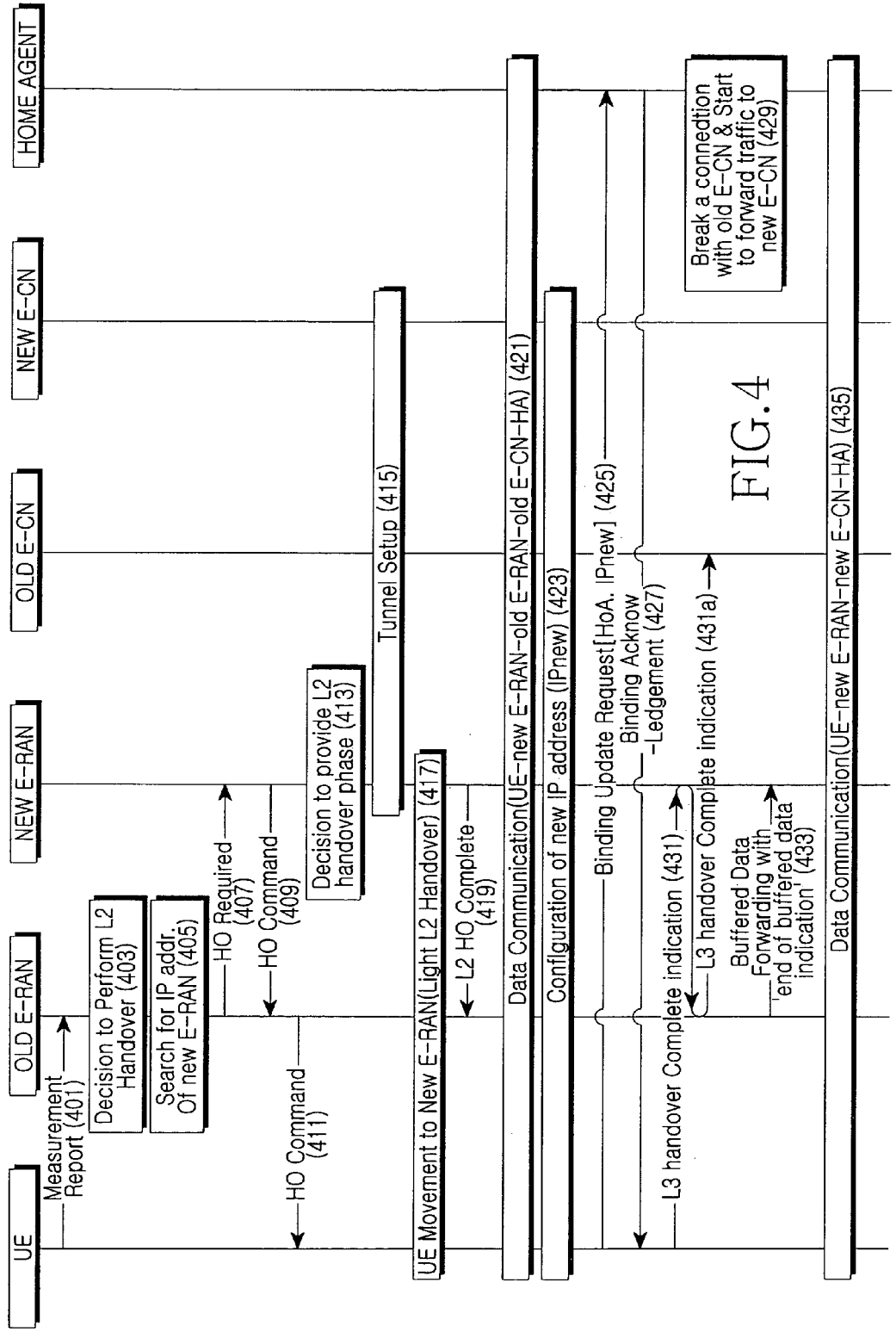
FIG. 4 is a diagram illustrating a signal flow for triggering a L3 handover by a new Enhanced-RAN (E-RAN) according to an exemplary embodiment of the present invention.

FIG. 4 is a diagram illustrating a signal flow for triggering a L3 handover by a new E-RAN according to an exemplary embodiment of the present invention.

Referring to FIG. 4, a UE collects radio-related information continuously. The UE sends information associated with measured cells to an old E-RAN currently serving the UE by a Measurement Report message, periodically or at a predetermined time in step 401. The Measurement Report message contains the International Mobile Station Identifier (IMSI) of the UE, an old IP address (hereinafter, referred to IPold) now in use for the UE, and cell measurements collected from neighbor cells.

Upon receipt of the Measurement Report message, the old E-RAN determines whether a L2 handover is required by checking whether there is any cell providing better performance than the serving cell based on the cell information. If such a cell (that is, a target cell) is detected, the old E-RAN decides on the L2 handover and selects a target cell for the handover in step 403. In step 405, the old E-RAN detects a routable address of a new E-RAN managing the target cell. The address of the new E-RAN is determined according to a protocol type between the old E-RAN and the new E-RAN. If the interface between the old E-RAN and new E-RAN is IP-based, the address of the new E-RAN will be similar to an IP address. In an exemplary implementation, it is assumed that the E-RANs communicate with each other over IP.

In step 407, the old E-RAN sends a HandOver (HO) Required message to the new E-RAN. The HO Required message contains the IMSI and IPold of the UE and a UE context including subscriber information of the UE. The information sent to the E-RAN is used for the new E-RAN to determine whether to perform the light L2 handover.

Upon receipt of the HO Required message, the new E-RAN determines whether to accept the L2 handover request for the UE. If the L2 handover request is accepted, the new E-RAN replies to the L2 handover request with a HO Command message in step 409. The HO Command message contains information needed for the UE to perform the L2 handover. Upon receipt of the HO Command message, the old E-RAN adds the address of the new E-RAN to the HO Command message and forwards the resulting message to the UE in step 411.

The new E-RAN determines whether to trigger phase 2 of L2 handover, that is the light L2 handover for the UE using the prefix of the IP address of the UE in step 413. In an exemplary embodiment of the present invention, if the prefix of the IPold of the UE is different from the prefix of the new E-CN connected to the new E-RAN, that is, if the old E-RAN and the new E-RAN are connected to different E-CNs, the new E-RAN omits phase 2 used for establishing a data connection to the old E-CN to support a fast L3 handover to the new E-CN. This light L2 handover prevents unnecessary resource consumption and supports fast L3 handover for the UE by skipping phase 2 of L2 handover in an inter-domain handover in which L3 handover follows L2 handover.

While the UE performs the L2 handover to the new E-RAN in step 417, the new E-RAN establishes a tunnel with the new E-CN, for L3 packet transmission in step 415. When the new E-RAN detects the movement of the UE along with the L2 handover, the new E-RAN sends a L2 HO Complete message to the old E-RAN in step 419. The old E-RAN deletes a UE context associated with the UE, determining that the L2 handover to the new E-RAN has been completed.

The new E-RAN completes the L2 handover without establishing a data communication path with the old E-CN, that is, without phase 2 of L2 handover in step 419. After the L2 handover, the UE sends and receives packets in a path from the new E-RAN through the old E-RAN and the old E-CN to the HA in step 421.

While the new E-RAN determines whether to trigger the light L2 handover for the UE in step 413 after sending the HO Command message to the old E-RAN in step 409, step 413 may be performed at any time after step 407 or step 417 where phase 1 of L2 handover is completed.

In step 423, the UE acquires a new IP address (IPnew) for use in the new E-CN. The IPnew is acquired in various known ways, which will not be described herein for clarity and conciseness. The UE registers the IPnew to the HA by a Binding Update message in order to enable routing of a packet forwarded to the UE to the IPnew in step 425. The Binding Update message contains the Home Address (HoA) of the UE and the IPnew to notify the HA of the IPnew. As described earlier, if the HA is included in a particular E-CN within the home domain of the UE, the Binding Update message is sent to the particular E-CN. The configuration and transmission of the Biding Update message complies with an existing technology supporting IP mobility, for example, Mobile IPv4 or Mobile IPv6.

The HA updates a temporary address of the UE mapped to the HoA with the IPnew in its binding cache. Then the HA notifies the UE of the successful completion of the binding update by a Binding Acknowledgement message in step 427. Then an existing connection is released between the HA and the old E-CN and all packets destined for the UE are forwarded to the UE via the new E-CN and the new E-RAN in step 429.

The UE sends a L3 HO Complete Indication message to the old E-RAN via the new E-RAN, notifying of completion of the L3 handover in step 431 and the old E-RAN forwards the L3 HO Complete Indication message to the old E-CN in step 431a. After sending all packets for the UE to the old E-RAN, the old E-CN deletes the UE context associated with the UE.

Upon receipt of the L3 HO Complete Indication message, the old E-RAN forwards all buffered data packets to the new E-RAN in step 433. The last forwarded packet contains an end indication of the buffered data to notify the new E-RAN that there is no more data packet to be sent. The new E-RAN explicitly releases a connection from the old E-RAN in response to the end indication of the buffered data.

In an exemplary implementation, it can be further contemplated that the connection between the old E-RAN and the new E-RAN is released implicitly using a timer after the buffered data packets are sent in step 433. When the UE receives the Binding Acknowledgement message in step 427 and packet transmission starts the IPnew, packets are not sent to the old E-CN any longer. Since a packet with the IPnew as a source address is sent through the tunnel between the new E-RAN and the new E-CN, packet transmission from the old E-CN to the old E-RAN can be terminated within a predetermined time. In an exemplary embodiment of the present invention, steps 431 and 433 may be performed before step 427. In this case, the new E-RAN re-orders the buffered data packets received from the old E-RAN and from the new E-CN, and forwards the re-ordered packets sequentially.

After the light L2 handover and the L3 handover, the UE sends and receives packets through the new E-RAN and the new E-CN in step 435.

Figure 5:
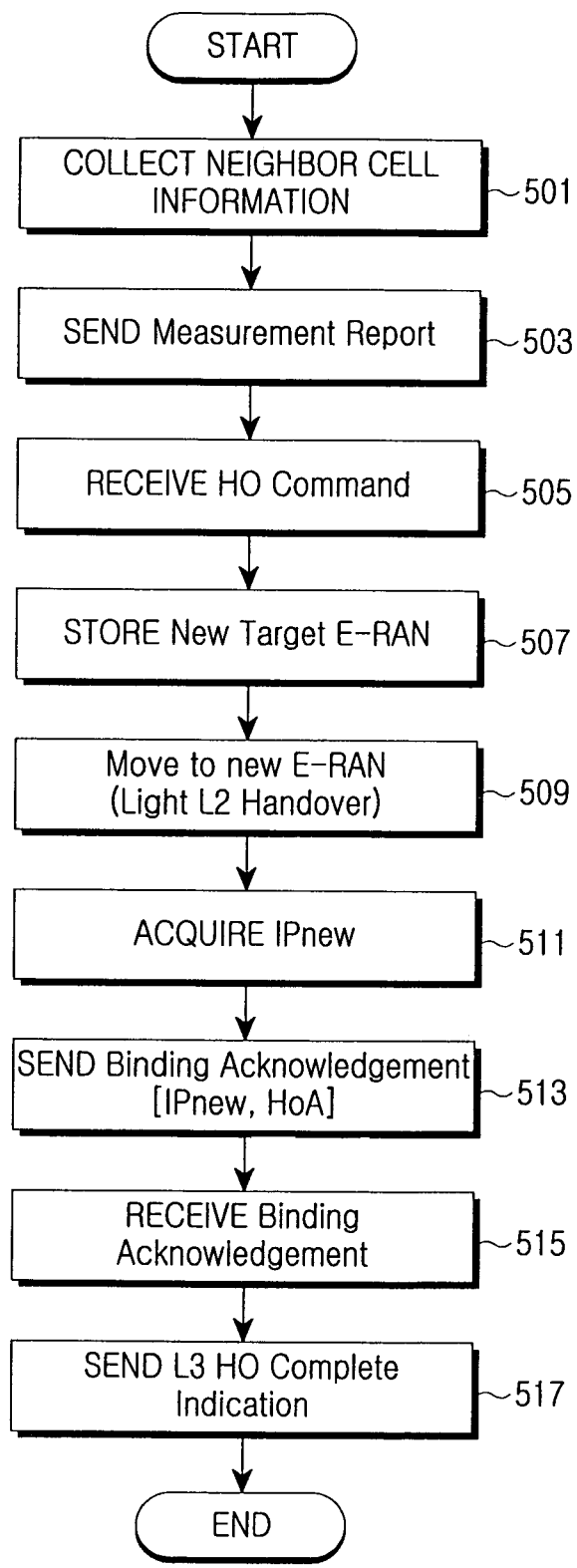
FIG. 5 is a detailed flowchart illustrating an operation of a UE according to an exemplary embodiment of the present invention.

FIG. 5 is a detailed flowchart illustrating an operation of the UE according to an exemplary embodiment of the present invention, which the UE sends and receives packets.

Referring to FIG. 5, the UE collects information about candidate cells during packet transmission/reception in step 501. In step 503, the UE sends a Measurement Report message including the IMSI of the UE and the collected cell information to the old E-RAN periodically or when a predetermined condition is fulfilled. In an exemplary implementation, it can be further contemplated that the Measurement Report message contains information about a UE-selected target cell for L2 handover as well as the IMSI of the UE.

In step 505, the UE receives a HO Command message in response to the Measurement Report message from the old E-RAN. The HO Command message contains the address of the new E-RAN for handover. The UE stores the address of the new E-RAN in step 507 and performs a L2 handover to the new E-RAN using the address of the new E-RAN in step 509. Thus, the UE sends and receives packets through the old E-CN, the old E-RAN, and the new E-RAN.

In step 511, the UE acquires an IPnew for use in the new E-CN. A procedure for acquiring the IPnew is beyond the scope of the present invention and thus will not be described herein for clarity and conciseness. The UE sends a Binding Update message to the HA to register the IPnew in step 513. The Binding Update message contains a HoA being a unique IP address of the UE, the IPnew set as a source address, and the HoA of the HA as a destination address. In step 515, the UE receives a Binding Acknowledgement message from the HA, notifying that the IPold of the UE has been updated with the IPnew. Then the UE sends a L3 HO Complete Indication message to the old E-CN in order to notify of completion of the L3 handover in step 517.

The old E-CN deletes a UE context associated with the UE, recognizing that the UE has moved to another network. Before the UE context deletion, the old E-CN may forward the UE context to the new E-CN. After the L2 handover and the L3 handover, the UE continues to send and receive packets through the new E-RAN and the new E-CN.

An E-Ran analyzes messages received from a UE or another E-RAN. Upon receipt of a Measurement Report message requesting L2 handover from the UE, the E-RAN operates as an old E-RAN. Upon receipt of a HO Required message from another E-RAN, the E-RAN operates as a new E-RAN. The operations of the old and new E-RANs will be described separately.

Figure 6:
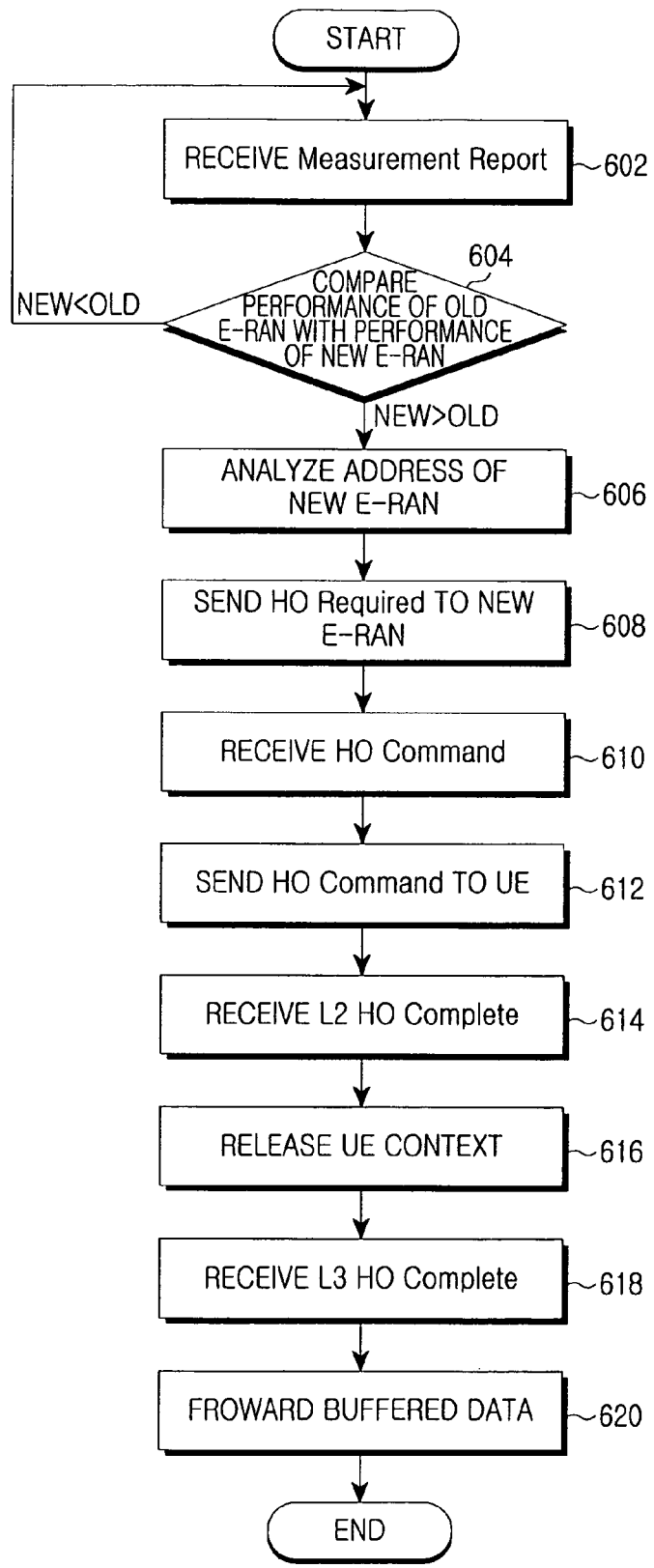
FIG. 6 is a flowchart illustrating an operation of an old E-RAN according to an exemplary embodiment of the present invention.

FIG. 6 is a flowchart illustrating an operation of the old E-RAN according to an exemplary embodiment of the present invention.

Referring to FIG. 6, during packet communication with the UE, the old E-RAN receives a Measurement Report message from the UE in step 602 and compares the radio performance that the old E-RAN can provide with the radio performances of the candidate cells based on cell information included in the Measurement Report message in step 604. If the Measurement Report message includes information indicating a target cell selected by the UE instead of the cell information, the old E-RAN jumps to step 606.

If none of the candidate cells offer better performance than the current radio performance, the old E-RAN returns to step 602 to receive the next Measurement Report message. On the contrary, if any candidate cell exists offering better performance than the current radio performance, the old E-RAN selects the candidate cell as a target cell and detects the routable address of the new E-RAN controlling the target cell in step 606. In step 608, the old E-RAN sends a HO Required message to the new E-RAN. The HO Required message contains the IMSI, IPold, and UE context information of the UE.

The old E-RAN receives a HO Command message from the new old E-RAN in response to the HO Required message in step 610. In step 612, the old E-RAN forwards the HO Command message attached with the address of the new E-RAN to the UE. The old E-RAN receives a L2 HO Complete message from the new E-RAN which has recognized L2 handover of the UE in step 614 and deletes the UE context for the UE in step 616.

In step 618, the old E-RAN receives a L3 HO Complete Indication message from the UE through the new E-RAN, thus determining that the UE has moved to another network. In step 620, the old E-RAN forwards all buffered data packets for the UE received from the old E-CN to the new E-RAN, and releases a link from the new E-RAN.

Figure 7:
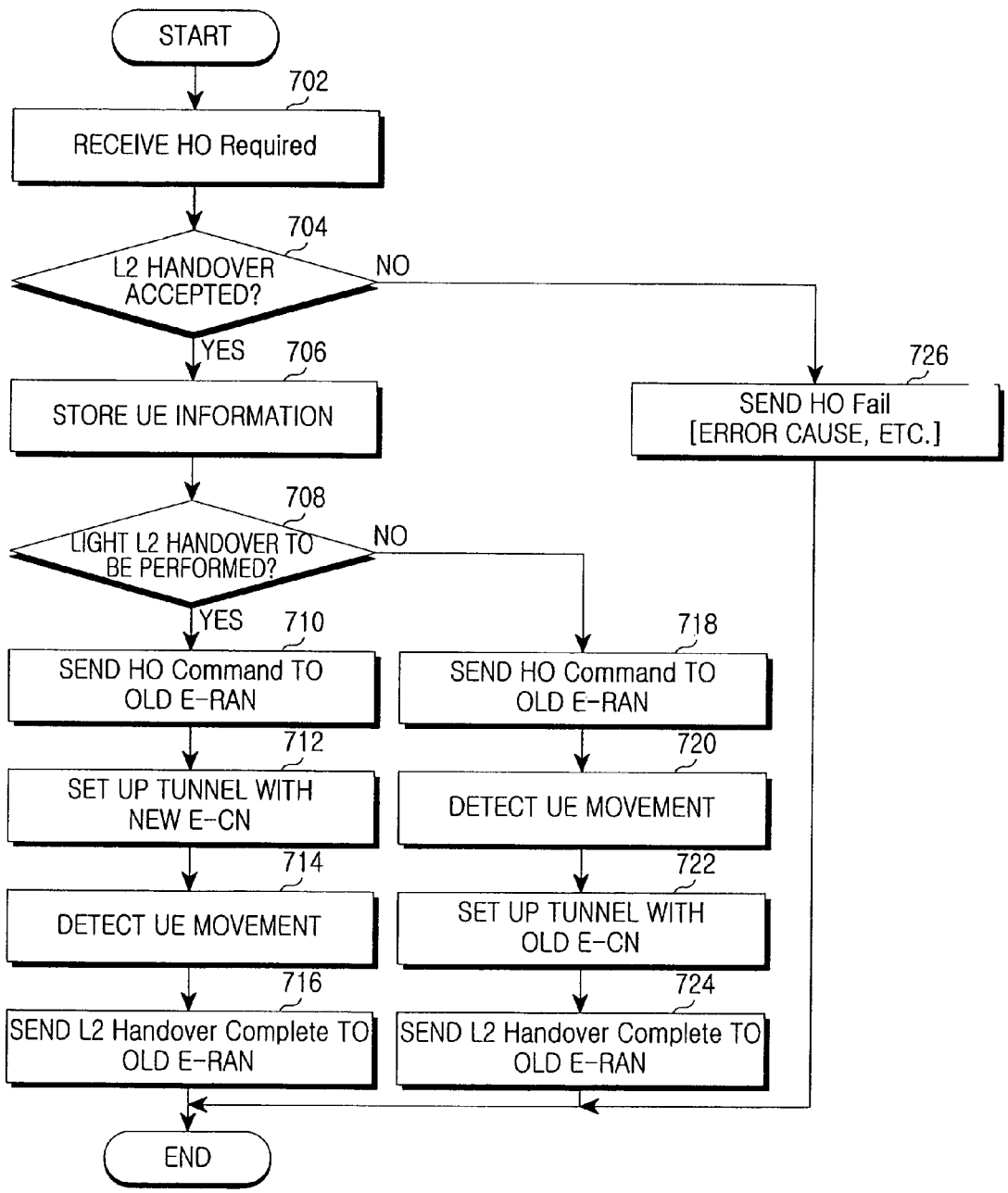
FIG. 7 is a flowchart illustrating an operation of a new E-RAN according to an exemplary embodiment of the present invention.

FIG. 7 is a flowchart illustrating an operation of the new E-RAN according to an exemplary embodiment of the present invention.

Referring to FIG. 7, the new E-RAN receives a HO Required message from the old E-RAN in step 702 and determines whether to accept the L2 handover request for the UE in step 704. If the L2 handover request cannot be accepted, the new E-RAN sends a HO Fail message with a cause value indicating the reason for rejecting the L2 handover request to the old E-RAN in step 726 and then terminates the handover procedure.

If the L2 handover request is accepted, the new E-RAN stores UE context information of the UE included in the HO Required message in step 706 and determines whether to perform a L3 handover, that is, phase 2 of L2 handover for the UE in step 708. Phase 2 is performed by comparing the prefix of the IPold of the UE included in the HO Required message with the prefix of the IP address of the new E-CN connected to the new E-RAN by a dedicated link. If the prefixes are different, phase 2 of the L2 handover is not triggered. If the prefixes are the same, phase 2 of the L2 handover is triggered.

In the former case, that is, in the case of a light L2 handover, the new E-RAN sends a HO Command message to the old E-RAN, notifying that the L2 handover request for the UE is accepted in step 710 and establishes a tunnel with the new E-CN in step 712. The IP tunnel between the new E-RAN and the new E-CN can be set up for the UE or for a particular service. After the tunnel setup, the new E-RAN detects the movement of the UE by phase 1 of the L2 handover in step 714. Considering that the UE has performed the L2 handover normally due to the detected movement of the UE, the new E-RAN sends a L2 HO Complete message to the old E-RAN in step 716. The old E-RAN awaits reception of a L3 HO Complete Indication message from the UE, while forwarding packets for the UE.

If the prefixes are the same in step 708, the new E-RAN proceeds to step 718 to perform phase 2 of the L2 handover. In step 718, the new E-RAN notifies the old E-RAN that the L2 handover request for the UE is accepted by a HO Command message. The new E-RAN detects the movement of the UE that has performed phase 1 of the L2 handover in step 720 and establishes a tunnel with the old E-CN, for packet transmission in step 722. In step 724, the new E-RAN then sends a L2 HO Complete message to the old E-RAN. The old E-RAN deletes a UE context in response to the L2 HO Complete message, considering that the L2 handover is complete.

Figure 8:
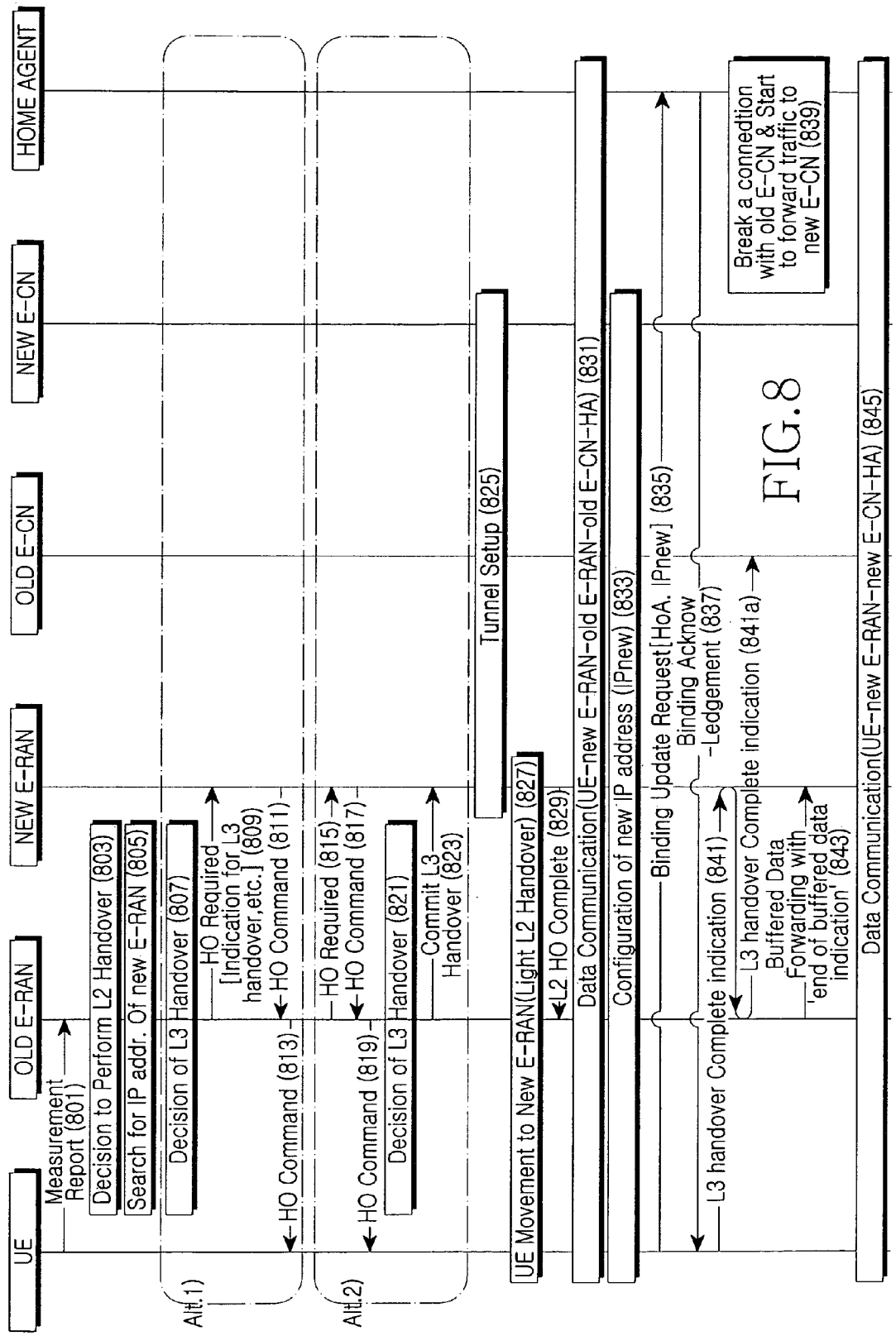
FIG. 8 is a diagram illustrating a signal flow for triggering a L3 handover by the old E-RAN according to an exemplary embodiment of the present invention.

FIG. 8 is a diagram illustrating a signal flow for triggering a L3 handover by the old E-RAN according to an exemplary embodiment of the present invention. The L3 handover can be implemented in two ways, Alt 1 (steps 807 to 813) and Alt 2 (steps 815 to 823). In Alt 1, the old E-RAN triggers a light L2 handover and a L3 handover by a L2 HO Required message, while in Alt 2, the old E-RAN triggers a light L2 handover and a L3 handover after receiving a response message for the L2 HO Required message. The old E-RAN determines whether to perform the light L2 handover irrespective of the time when phase 2 of L2 handover is performed in Alt 1 and Alt 2.

Referring to FIG. 8, the UE collects radio-related information from neighbor cells continuously. The UE sends a Measurement Report message to the old E-RAN currently serving the UE, periodically or at a predetermined time in step 801. The Measurement Report message contains the IMSI of the UE and the collected cell information about the neighbor cells. In step 803, the old E-RAN determines whether to perform a L2 handover for the UE based on the cell information received from the UE by checking whether there is any cell providing better performance than the serving cell based on the cell information.

In determining to perform the L2 handover and detecting such a cell (that is, a target cell), the old E-RAN detects the routable address of the new E-RAN managing the target cell in step 805. The address of the new E-RAN is determined according to a protocol type between the old E-RAN and the new E-RAN. If the interface between the old E-RAN and new E-RAN is IP-based, the address of the new E-RAN will be similar to an IP address. In an exemplary implementation, it is assumed that the E-RANs communicate with each other over IP.

In Alt, the old E-RAN decides as to whether to perform a L3 handover for the UE in step 807. For example, the old E-RAN compares the prefix of the IP address of the new E-CN to which the new E-RAN belongs with the prefix of the IP address of the old E-CN to which the old E-RAN belongs. If the prefixes are different, the old E-RAN decides on the L3 handover, without triggering phase 2 of L2 handover in which a data path is established between the new E-RAN and the old E-CN. In other words, the old E-RAN decides on a light L2 handover.

The old E-Ran sends a HO Required message requesting phase 1 of L2 handover for the UE to the new E-RAN in step 809. The HO Required message contains the ID (that is, IMSI or IP address) of the UE and an indication for L3 handover requesting preparation for the L3 handover. The L3 handover indication indicates whether the L3 handover, that is, the light L2 handover will be performed. As described above, phase 2 of L2 handover is not performed in the light L2 handover.

Upon receipt of the HO Required message, the new E-RAN determines whether to accept the L2 handover request for the UE. If the L2 handover request is accepted, the new E-RAN replies to the L2 handover request with a HO Command message indicating that the L2 handover request is accepted in step 811. The HO Command message contains information needed for the UE to perform the L2 handover. Upon receipt of the HO Command message, the old E-RAN adds the address of the new E-RAN to the HO Command message and forwards the resulting message to the UE in step 813.

In Alt 2, the old E-RAN sends a HO Required message requesting a L2 handover to the new E-RAN in step 815 and receives a HO Command message indicating that the L2 handover request is accepted from the new E-RAN in step 817. In step 819, the old E-RAN adds the address of the new E-RAN to the HO Command message and forwards the resulting message to the UE. The old E-RAN then determines whether to perform a L3 handover for the UE in step 821. For example, the old E-RAN compares the prefix of the IP address of the new E-CN to which the new E-RAN belongs with the prefix of the IP address of the old E-CN to which the old E-RAN belongs. If the prefixes are different, the old E-RAN decides on the L3 handover, without triggering phase 2 of L2 handover in which a data path is established between the new E-RAN and the old E-CN. In other words, the old E-RAN decides on a light L2 handover.

In step 823, the old E-RAN notifies the new E-RAN that phase 2 of L2 handover will not be performed and sends a Commit L3 Handover message to the new E-RAN in order to trigger setup of a tunnel for the L3 handover with the new E-RAN. The new E-RAN considers that the L2 handover tunnel setup has been triggered just by receiving the Commit L3 Handover message. The Commit L3 Handover message may indicate the L3 handover by a Message ID or contain a L3 handover indication. Step 821 is based on the premise of using the same network prefix in the E-CN and the corresponding E-RAN in Alt 2.

When recognizing that the L3 handover has been triggered in Alt 1 or Alt 2, the new E-RAN establishes a tunnel for packet transmission with the new E-CN in step 825. In step 827, the terminal performs the light L2 handover to the new E-RAN using the address of the new E-RAN included in the HO Command message of step 813 or step 819. In step 829, the new E-RAN detects the movement of the UE by the light L2 handover and sends a L2 HO Complete message to the old E-RAN. The L2 HO Complete message indicates to the old E-RAN that the L2 handover has been completed successfully. The old E-RAN then deletes a UE context associated with the UE.

That is, the L2 handover is completed without performing phase 2 of L2 handover, that is, without setting up a data connection between the new E-RAN and the old E-CN in step 829. Thus, the UE sends and receives packets through the new E-RAN, the old E-RAN, the old E-CN, and the HA, in step 831.

After the light L2 handover, the UE acquires an IPnew for use in the new E-CN in step 833 and registers the IPnew to the HA by a Binding Update message in order to route a packet destined for the UF to the IPnew in step 835. The Binding Update message contains the HoA of the UE and the IPnew to notify the HA of the IPnew.

The HA updates a temporary address of the UE mapped to the HoA with the IPnew in its binding cache. Then the HA notifies the UE of the successful completion of the binding update by a Binding Acknowledgement message in step 837. Then an existing connection is released between the HA and the old E-CN and all packets destined for the UE are forwarded to the UE via the new E-CN and the new E-RAN in step 839.

The UE sends a L3 HO Complete Indication message to the old E-RAN via the new E-RAN, notifying of completion of the L3 handover in step 841 and the old E-RAN forwards the L3 HO Complete Indication message to the old E-CN in step 841a, so that the old E-CN deletes the UE context associated with the UE.

Upon receipt of the L3 HO Complete Indication message, the old E-RAN forwards all buffered data packets to the new E-RAN in step 843. The last forwarded packet contains an end indication of the buffered data to notify the new E-RAN that there is no more data packet to be sent. The new E-RAN explicitly releases a connection from the old E-RAN in response to the end indication of the buffered data.

After the light L2 handover and the L3 handover, the UE sends and receives packets through the new E-RAN and the new E-CN in step 845.

In accordance with an exemplary embodiment of the present invention, the UE operates in the same manner as illustrated in FIG. 5 and an E-RAN operates as an old E-RAN or a new E-RAN depending on a received message. The operations of the old E-RAN and the new E-RAN will be described separately in Alt 1 and Alt 2.

Figure 9:
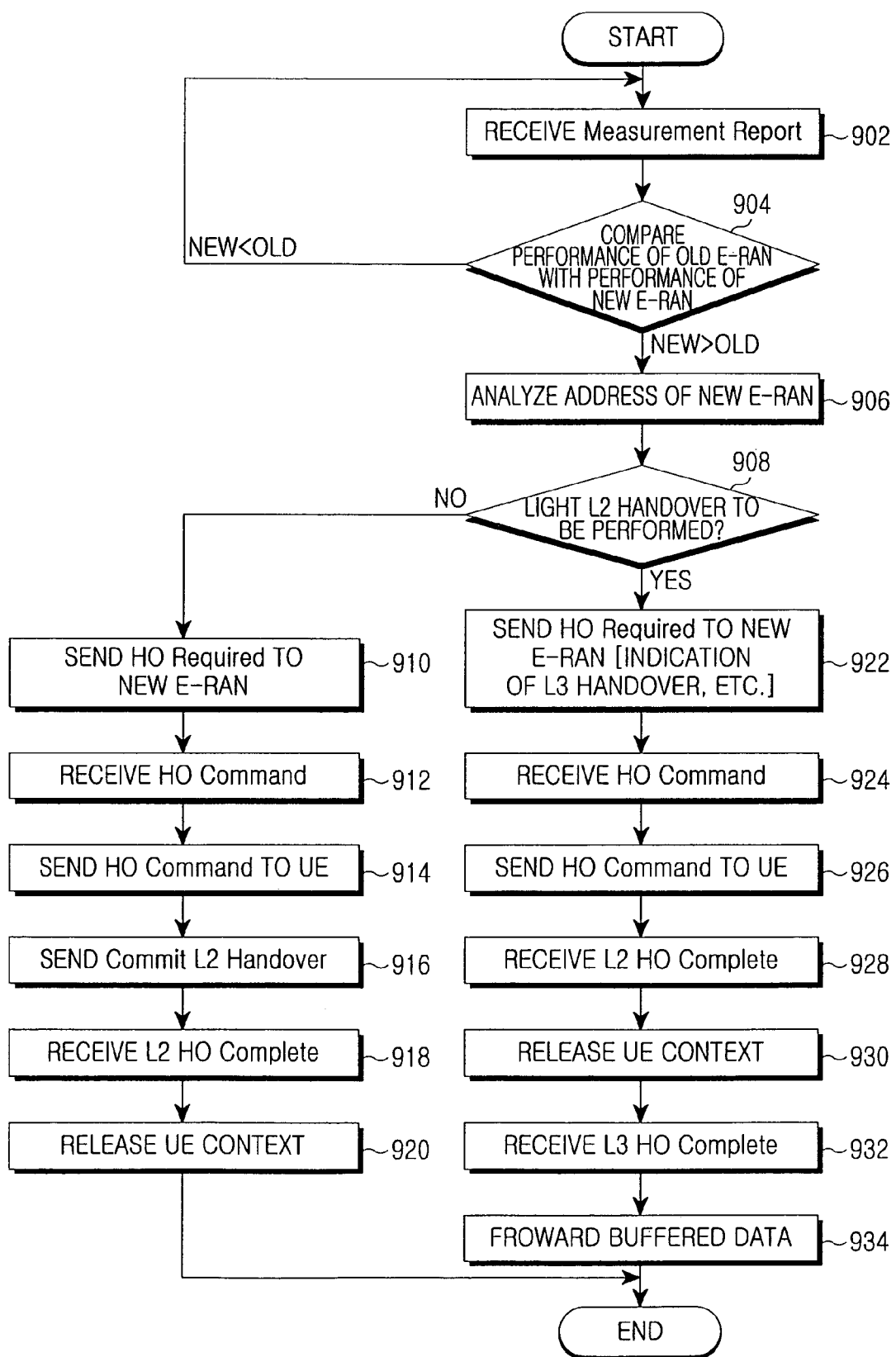
FIG. 9 is a detailed flowchart illustrating an operation of the old E-RAN in Alt 1 according to an exemplary embodiment of the present invention.

FIG. 9 is a detailed flowchart illustrating an operation of the old E-RAN in Alt 1 according to an exemplary embodiment of the present invention.

Referring to FIG. 9, during packet communication with the UE, the old E-RAN receives a Measurement Report message from the UE in step 902 and compares the radio performance that the old E-RAN can provide with the radio performances of the candidate cells based on cell information included in the Measurement Report message in step 904. If the Measurement Report message includes information indicating a target cell selected by the UE instead of cell information measured by the UE, the old E-RAN jumps to step 906.

If none of the candidate cells offer better performance than the current radio performance, the old E-RAN returns to step 902 to receive the next Measurement Report message. On the contrary, if any candidate cell exists offering better performance than the current radio performance, the old E-RAN selects the candidate cell as a target cell and detects the routable address of the new E-RAN controlling the target cell in step 906. In step 908, the old E-RAN determines whether to perform a L3 handover, that is, phase 2 of L2 handover for the UE. Phase 2 is performed by comparing the prefix of the IPold of the UE included in the HO Required message with that of the IP address of the new E-CN connected to the new E-RAN by a dedicated link. If the prefixes are different, phase 2 of the L2 handover is not triggered. If the prefixes are the same, phase 2 of the L2 handover is triggered.

In the former case, that is, in the case of a light L2 handover, the old E-RAN sends a HO Required message to the new E-RAN, requesting a light L2 handover in step 922. The HO Required message contains a L3 handover indication indicating to the new E-RAN that the light L2 handover will take place and thus the L3 handover will follow phase 1 of L2 handover. In step 924, the old E-RAN receives a HO Command message indicating that the light L2 handover request is accepted from the new E-RAN. In step 926, the old E-RAN forwards the HO Command message attached with the address of the new E-RAN to the UE.

The old E-RAN receives a L2 HO Complete message from the new E-RAN in step 928 and deletes the UE context associated with the UE in response to the L2 HO Complete message in step 930. Upon receipt of a L3 HO Complete Indication message from the UE in step 932, the old E-RAN forwards all buffered data packets for the UE, received from the old E-CN, to the new E-RAN and releases a link from the new E-RAN in step 934.

If it is determined that phase 2 of L2 handover will be performed in step 908, the old E-RAN sends a HO Required message to the new E-RAN, requesting a L2 handover in step 910 and receives a HO Command message indicating that the L2 handover request is accepted from the new E-RAN in step 912. In step 914, the old E-RAN forwards the HO Command message attached with the address of the new E-RAN to the UE. After forwarding the HO Command message, the old E-RAN sends a Commit L2 Handover message to the old E-CN or the new E-RAN in order to trigger phase 2 of the L2 handover in step 916. After the UE moves to the new E-RAN and completes phase 2 of the L2 handover, the old E-RAN receives a L2 HO Complete message from the new E-RAN in 918. In step 920, the old E-RAN forwards all buffered data packets for the UE to the new E-RAN and deletes the UE context.

Figure 10:
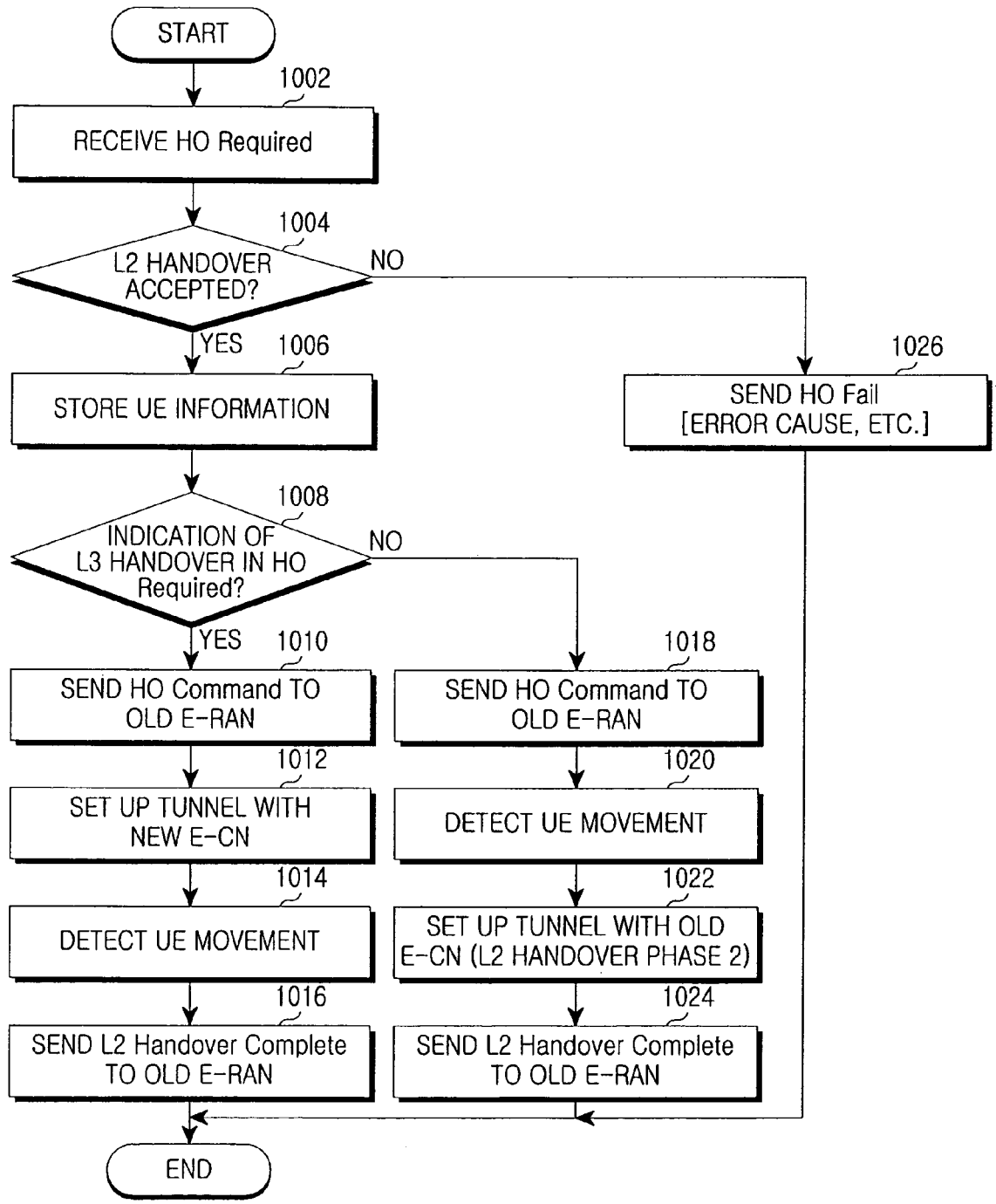
FIG. 10 is a detailed flowchart illustrating an operation of the new E-RAN in Alt 1 according to an exemplary embodiment of the present invention.

FIG. 10 is a detailed flowchart illustrating an operation of the new E-RAN in Alt 1 according to an exemplary embodiment of the present invention.

Referring to FIG. 10, the new E-RAN receives a HO Required message from the old E-RAN in step 1002 and determines whether to accept the L2 handover request for the UE in step 1004. If the L2 handover request cannot be accepted, the new E-RAN sends a HO Fail message with a cause value indicating the reason for rejecting the L2 handover request to the old E-RAN in step 1026 and then terminates the handover procedure.

If the L2 handover request is accepted, the new E-RAN stores UE context information of the UE included in the HO Required message in step 1006 and checks whether the HO Required message includes a L3 handover indication indicating whether a L3 handover will be performed for the UE in step 1008. In the presence of the L3 handover indication, the new E-RAN sends a HO Command message to the old E-RAN, notifying that the L2 handover request for the UE is accepted in step 1010 and establishes a tunnel with the new E-CN in step 1012. After the tunnel setup, the new E-RAN detects the movement of the UE by phase 1 of the L2 handover in step 1014. Considering that the UE has performed the L2 handover normally due to the detected movement of the UE, the new E-RAN sends a L2 HO Complete message to the old E-RAN in step 1016.

In the absence of the L3 handover indication in step 1008, the new E-RAN sends a HO Command message to the old E-RAN in step 1018 and detects the movement of the UE by phase 1 of the L2 handover in step 1020. In step 1022, the new E-CN establishes a tunnel for packet transmission with the old E-CN. The new E-RAN then sends a L2 HO Complete message to the old E-RAN in step 1024. Upon receipt of the L2 HO Complete message, the old E-RAN forwards all buffered data packets to the new E-RAN, recognizing completion of the L2 handover, and deletes the UE context.

Figure 11:
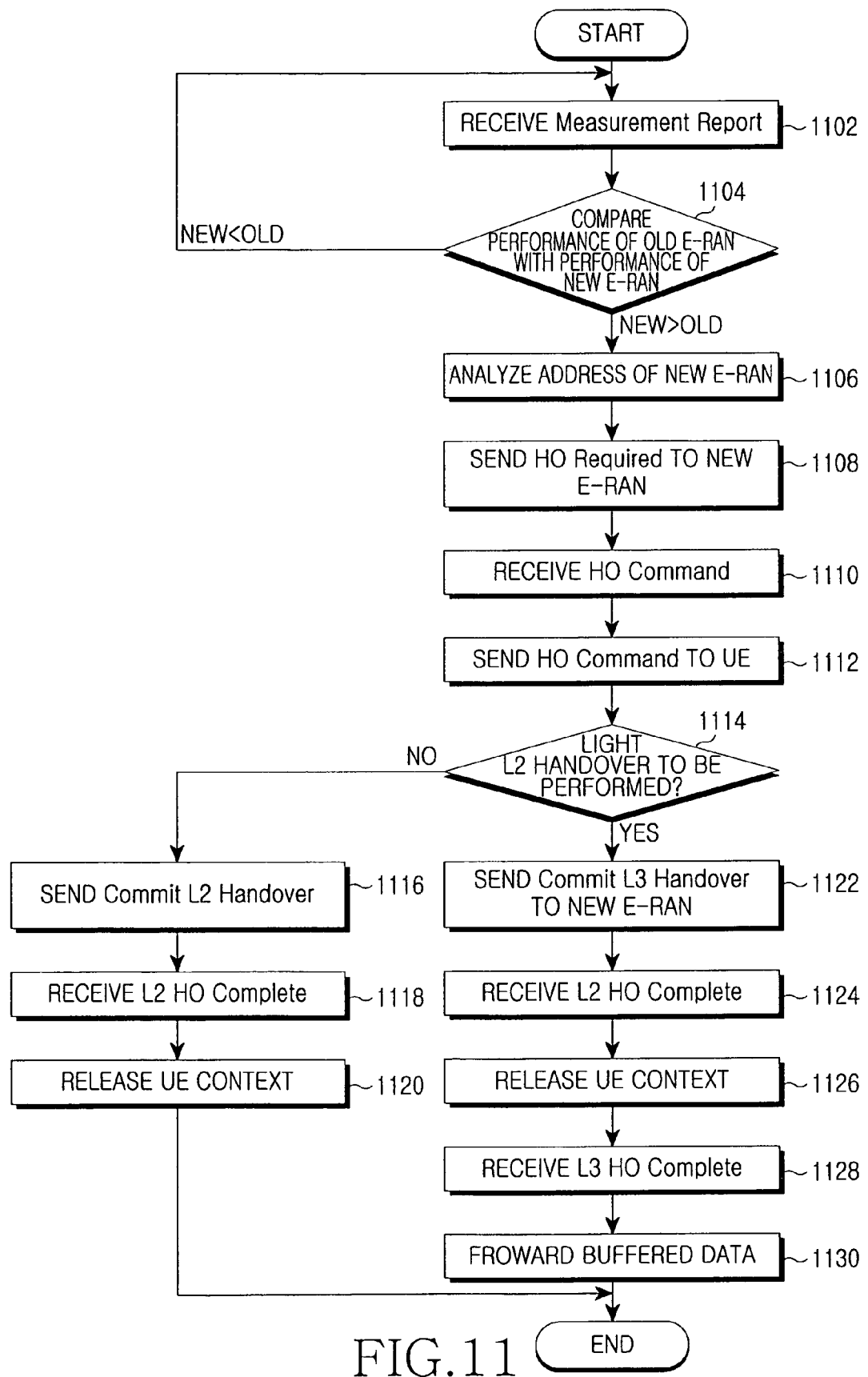
FIG. 11 is a detailed flowchart illustrating an operation of the old E-RAN in Alt 2 according to an exemplary embodiment of the present invention.

FIG. 11 is a detailed flowchart illustrating an operation of the old E-RAN in Alt 2 according to an exemplary embodiment of the present invention.

Referring to FIG. 11, during packet communication with the UE, the old E-Ran receives a Measurement Report message from the UE in step 1102 and compares the radio performance that the old E-RAN can provide with the radio performances of the candidate cells based on cell information included in the Measurement Report message in step 1104. If the Measurement Report message includes information indicating a target cell selected by the UE instead of cell information measured by the UE, the old E-RAN jumps to step 1106.

If none of the candidate cells offer better performance than the current radio performance, the old E-RAN returns to step 1102 to receive the next Measurement Report message. On the contrary, if any candidate cell exists offering better performance than the current radio performance, the old E-RAN selects the candidate cell as a target cell and detects the routable address of the new E-RAN controlling the target cell in step 1106. The old E-RAN sends a HO Required message to the new E-RAN, requesting a light L2 handover in step 1108 and receives a HO Command message indicating that the light L2 handover request is accepted from the new E-RAN in step 1110. In step 1112, the old E-RAN forwards the HO Command message attached with the address of the new E-RAN to the UE.

In step 1114, the old E-RAN determines whether to perform a L3 handover, that is, phase 2 of L2 handover for the UE. Phase 2 is performed by comparing the prefix of the IPold of the UE included in the HO Required message with the prefix of the IP address of the new E-CN connected to the new E-RAN by a dedicated link. If the prefixes are different, phase 2 of the L2 handover is not triggered. If the prefixes are the same, phase 2 of the L2 handover is triggered.

If phase 2 of L2 handover is not triggered, that is, in the case of a light L2 handover, the old E-RAN sends a Commit L3 Handover message to the new E-RAN in step 1122. The Commit L3 Handover message is used to notify that phase 2 of the L2 handover is not performed and the L3 handover follows immediately, and to request setup of a tunnel between the new E-RAN and the new E-CN for the L3 handover.

In step 1124, the old E-RAN receives a L2 HO Complete message indicating that the light L2 handover is completed in the new E-RAN. In step 1126, the old E-RAN deletes a UE context associated with the UE. Upon receipt of a L3 HO Complete Indication message from the UE in step 1128, the old E-RAN forwards all buffered data packets for the UE, received from the old E-CN, to the new E-RAN and releases a link from the new E-RAN in step 1130.

If it is determined that phase 2 of L2 handover will be performed in step 1114, the old E-RAN sends a Commit L2 Handover message to the entity that starts phase 2 of L2 handover for the UE, that is, the old E-CN or the new E-RAN, requesting a L2 handover in step 1116 and receives a L2 HO Complete message from the new E-RAN in step 1118. In step 1120, the old E-RAN deletes the UE context in response to the L2 HO Complete message.

Figure 12:
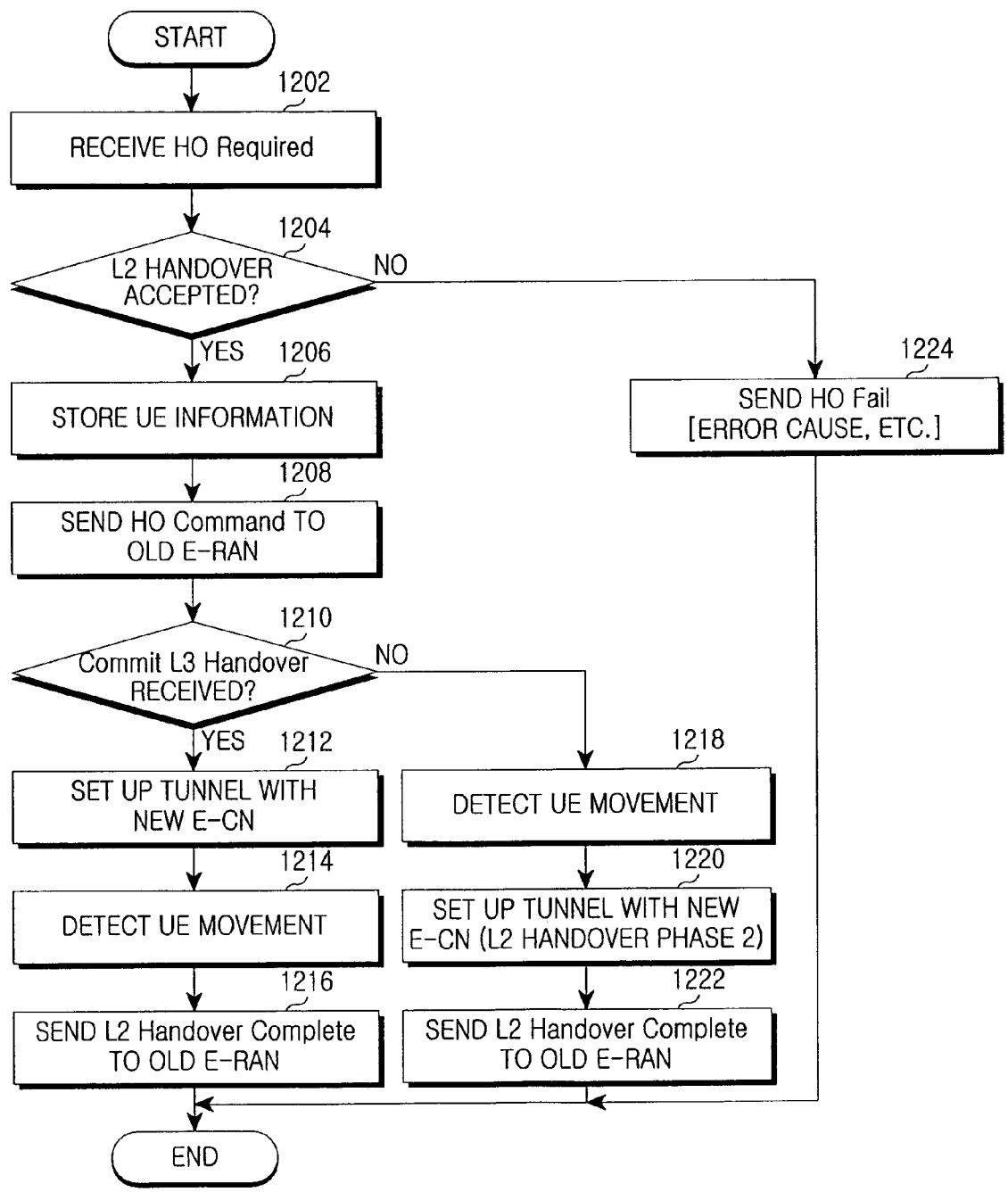
FIG. 12 is a detailed flowchart illustrating an operation of the new E-RAN in Alt 2 according to an exemplary embodiment of the present invention.

FIG. 12 is a detailed flowchart illustrating an operation of the new E-RAN in Alt 2 according to an exemplary embodiment of the present invention.

Referring to FIG. 12, the new E-RAN receives a HO Required message from the old E-RAN in step 1202 and determines whether to accept the L2 handover request for the UE in step 1204. If the L2 handover request cannot be accepted, the new E-RAN sends a HO Fail message with a cause value indicating the reason for rejecting the L2 handover request to the old E-RAN in step 1224 and then terminates the handover procedure.

If the L2 handover request is accepted, the new E-RAN stores UE context information of the UE included in the HO Required message in step 1206. After sending a HO Command message to the old E-RAN in step 1208, the new E-RAN awaits reception of a Commit L3 Handover message in step 1210. Upon receipt of the Commit L3 Handover message from the old E-RAN within a predetermined time before and after the L2 handover, the new E-RAN establishes a tunnel with the new E-CN in step 1212. After the tunnel setup, the new E-RAN detects the movement of the UE by a L3 handover in step 1214. The new E-RAN then sends a L2 HO Complete message to the old E-RAN in step 1216 and terminates the handover procedure.

If the Commit L3 Handover message is not detected from the old E-RAN within the predetermined time, the new E-RAN detects the L2 handover of the UE in step 1218 and establishes a tunnel for packet transmission with the old E-CN in step 1220. The new E-RAN then sends a L2 HO Complete message to the old E-RAN in step 1222 and ends the handover procedure.

In accordance with the exemplary embodiments of the present invention as described above, a L2 handover procedure involved in a L3 handover is simplified in a packet-switched network. Therefore, a L3 handover can be quickly provided.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of performing a handover between Core Networks (CNs) in a packet-switched network having a plurality of Radio Access Networks (RANs) accessible to a User Equipment (UE) and the CNs for connecting the RANs to an external network over an Internet Protocol (IP), the method comprising:

sending a measurement report message including cell information to an old RAN by a UE connected to an old CN through the old RAN, when the UE moves from the old RAN to a new RAN belonging to a new CN;

determining whether a Layer 3 (L3) handover is to be performed between the CNs by at least one of the old RAN and the new RAN;

establishing a tunnel between the new RAN and the new CN, if the L3 handover is to be performed between the CNs;

performing a handover from the old RAN to the new RAN by the UE after establishing the tunnel between the new RAN and the new CN, sending a Layer 2 (L2) handover complete message to the old RAN by the new RAN, as the new RAN detects the movement of the UE and communicating with the old CN through the new RAN and the old RAN by the UE; and acquiring a new IP address for use in the new CN after moving to the new RAN, performing the L3 handover, and communicating with the new CN through the new RAN using the tunnel by the UE, wherein establishing the tunnel between the new RAN and the new CN comprises setting up a new data path between the new RAN and the new CN, and data buffered in the old RAN is forwarded to the UE via the new RAN, and wherein the UE performs the handover from the old RAN to the new RAN without establishing a tunnel between the new RAN and the old CN.

2. The method of claim 1, wherein the determining of whether a L3 handover is to be performed comprises:

sending a handover required message to the new RAN by the old RAN, in response to the measurement report message;

sending a handover command message to the old RAN indicating that the L2 handover is accepted by the new RAN, in response to the handover required message;

inserting an address of the new RAN in the handover command message and forwarding the handover command message with the address of the new RAN to the UE by the old RAN; and determining whether the L3 handover is to be performed by comparing an IP address of the UE with an IP address of the new CN by the new RAN, after receiving the handover required message from the old RAN.

3. The method of claim 1, wherein the determining of whether a L3 handover is to be performed comprises:
   determining whether the L3 handover is to be performed by comparing the IP address of the UE with the IP address of the new CN by the old RAN, in response to the measurement report message;
   sending a handover required message requesting the L3 handover to the new RAN by the old RAN, if the L3 handover is to be performed;
   sending to the old RAN a handover command message indicating that the L2 handover is accepted by the new RAN, in response to the handover required message; and
   inserting the address of the new RAN in the handover command message and forwarding the handover command message with the address of the new RAN to the UE by the old RAN.

4. The method of claim 3, wherein the handover required message includes a L3 handover indication requesting preparation for the L3 handover.

5. The method of claim 1, wherein the determining of whether a L3 handover is to be performed comprises:
   sending a handover required message requesting the L3 handover to the new RAN by the old RAN, in response to the measurement report message;
   sending to the old RAN a handover command message indicating that the L2 handover is accepted by the new RAN, in response to the handover required message;
   inserting the address of the new RAN in the handover command message and forwarding the handover command message with the address of the new RAN to the UE by the old RAN;
   determining whether the L3 handover is to be performed by comparing the IP address of the UE with the IP address of the new CN by the old RAN; and
   sending to the new RAN a commit L3 handover message indicating that the L3 handover is to be performed by the old RAN, if the L3 handover is to be performed.

6. The method of claim 5, wherein the handover required message includes a L3 handover indication requesting preparation for the L3 handover.

7. The method of claim 2, wherein the determining of whether a L3 handover is to be performed comprises determining whether to perform the L3 handover if a prefix of the IP address of the UE is different from a prefix of the IP address of the new CN.

8. The method of claim 3, wherein the determining of whether a L3 handover is to be performed comprises determining whether to perform the L3 handover if a prefix of an IP address of the old CN is different from the prefix of the IP address of the new CN.

9. The method of claim 5, wherein the determining of whether a L3 handover is to be performed comprises determining whether to perform the L3 handover if a prefix of an IP address of the old CN is different from the prefix of the IP address of the new CN.

10. The method of claim 1, further comprising the steps of:
    sending to the old RAN a L3 handover complete indication message indicating completion of the handover to the new CN through the new RAN by the UE; and
    forwarding buffered data packets to the new E-RAN and deleting context information regarding the UE by the old RAN, in response to the L3 handover complete indication message.

11. The method of claim 10, further comprising registering the new IP address to a home agent associated with the UE by the UE, after acquiring the new IP address.

12. An apparatus for performing a handover between Core Networks (CNs) in a packet-switched network, comprising:
    an old Radio Access Network (RAN) belonging to an old CN, for receiving a measurement report message requesting a handover from a User Equipment (UE), generating a handover required message in response to the measurement report message, receiving a handover command message for the UE, and forwarding the handover command message to the UE; and
    a new RAN belonging to a new CN, for sending the handover command message to the old RAN in response to the handover required message, determining whether a Layer 3 (L3) handover is to be performed between the old CN and the new CN by comparing an Internet protocol (IP) address of the UE with an IP address of the new CN, and establishing a tunnel with the new CN,
    wherein the UE communicates with the old CN through the new RAN and the old RAN, acquires a new IP address for use in the new CN after performing an inter-RAN handover in response to the handover command message, performing the L3 handover using the new IP address, and communicating with the new CN through the new RAN using the tunnel,
    wherein establishing the tunnel between the new RAN and the new CN comprises setting up a new data path between the new RAN and the new CN, and data buffered in the old RAN is forwarded to the UE via the new RAN, and
    wherein the UE performs the handover from the old RAN to the new RAN without establishing a tunnel between the new RAN and the old CN.

13. The apparatus of claim 12, wherein the new RAN determines whether to perform the L3 handover if a prefix of the IP address of the UE is identical to a prefix of the IP address of the new CN.

14. An apparatus for performing a handover between Core Networks (CNs) in a packet-switched network, comprising:
    an old Radio Access Network (RAN) belonging to an old CN, for receiving a measurement report message requesting a handover from a User Equipment (UE), generating a handover required message in response to the measurement report message, receiving a handover command message for the UE, forwarding the handover command message to the UE, and determining whether a Layer 3 (L3) handover is to be performed between the old CN and the new CN by comparing an Internet protocol (IP) address of the UE with an IP address of a new CN; and
    a new RAN belonging to the new CN and communicating the old RAN, for sending the handover command message to the old RAN in response to the handover required message, and establishing a tunnel with the new CN if the old RAN determines the L3 handover is to be performed,
    wherein the UE communicates with the old CN through the new RAN and the old RAN, acquires a new IP address for use in the new CN after performing an inter-RAN handover in response to the handover command message, performing the L3 handover using the new IP address, and communicating with the new CN through the new RAN using the tunnel, wherein establishing the tunnel between the new RAN and the new CN comprises setting up a new data path between the new RAN and the new CN, and data buffered in the old RAN is forwarded to the UE via the new RAN, and wherein the UE performs the handover from the old RAN to the new RAN without establishing a tunnel between the new RAN and the old CN.

15. The apparatus of claim 14, wherein the old RAN determines whether to perform the L3 handover if a prefix of the IP address of the UE is different from a prefix of the IP address of the new CN.

16. The apparatus of claim 14, wherein the old RAN sends a L3 handover indication requesting preparation for the L3 handover by the handover required message.

17. The apparatus of claim 14, wherein if the L3 handover is to be performed, the old RAN sends a commit L3 handover message indicating that the L3 handover is to be performed to the new RAN.

18. The apparatus of claim 17, wherein the old RAN sends a L3 handover indication requesting preparation for the L3 handover by the commit L3 handover message.

* * * * *